(12) United States Patent
Stancel et al.

(10) Patent No.: US 6,437,898 B1
(45) Date of Patent: Aug. 20, 2002

(54) DEVICE FOR CHANGING THE PASSAGE OF LIGHT THROUGH A WINDOW, ESPECIALLY THROUGH THE TRANSPARENT COVER OF A MOTOR VEHICLE ROOF

(75) Inventors: Robert Stancel, Los Altos Hills, CA (US); David Rinaldis, Longmont, CO (US)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/715,924

(22) Filed: Nov. 20, 2000

(51) Int. Cl.[7] .............................................. G02B 26/02
(52) U.S. Cl. ...................... 359/230; 359/227; 296/215
(58) Field of Search .................................. 359/227, 230, 359/233; 296/97.1–97.4, 96.19, 215, 216.01

(56) References Cited

U.S. PATENT DOCUMENTS

| 5,405,184 A | | 4/1995 | Jardin et al. |
| 5,905,589 A | * | 5/1999 | Tanaka et al. ............... 359/230 |

* cited by examiner

*Primary Examiner*—James Phan
(74) *Attorney, Agent, or Firm*—Nixon Peabody LLP; David S. Safran

(57) ABSTRACT

A device for changing the passage of light through a window, especially through a transparent cover of a motor vehicle roof toward the motor vehicle interior, by at least two strip-shaped grid structures which are arranged to be able to move on top of one another. In order to achieve adjustable light effects, especially in a motor vehicle interior, at least one grid structure is formed from alternately transparent and opaque strips and another grid structure is formed from at least two colored strips of different color in a repeating sequence and the mutual positioning of the grid structures can be set by an actuating means.

18 Claims, 4 Drawing Sheets

DEVICE FOR CHANGING THE PASSAGE OF LIGHT THROUGH A WINDOW, ESPECIALLY THROUGH THE TRANSPARENT COVER OF A MOTOR VEHICLE ROOF

BACKGROUND OF THE INVENTION

1. Field of the Invention

The invention relates to a device for changing the passage of light through a window, especially through the transparent cover of a motor vehicle roof toward the motor vehicle interior, by means of two strip-shaped grid structures which lie on top of one another and which are arranged to be able to move on top of one another, and their mutual positioning can be set by an actuating means.

2. Description of the Related Art

German Patent DE 42 32 660 C1 (corresponds to U.S. Pat. No. 5,405,184) discloses a transparent cover for a motor vehicle roof which has an outside window and an inside window and a device, located in the intermediate space between the two windows, for changing the incidence of light toward the vehicle interior. This device contains a strip-shaped grid which is located on the bottom of the outside window, the strip-shaped grid composed of alternately transparent and opaque strips and one such grid composed of alternately transparent and opaque strips which is located on the top of the inside window. The inside window can be moved in the lengthwise direction of the motor vehicle by an amount which corresponds at least to the width of a grid strip. With this device for darkening the motor vehicle interior, a setting of the light transparency can be chosen which is, for example, from 0 to 50%, depending on the width of the strips.

SUMMARY OF THE INVENTION

The primary object of the invention is to provide a device which allows more extensive possibilities for changing and influencing the incidence of light through a window or into the vehicle interior.

This object is achieved with a device for changing the passage of light through a window with at least two strip-shaped grid structures which lie on top of one another, the grid structures are movable on top of one another, and mutual positioning of the grid structures can be set by an actuating device, where one grid structure is formed from alternately transparent and opaque strips and the other grid structure is formed from at least two colored strips of different color in a repeating sequence. With this device, depending on the respective mutual position of the two grid structures, a certain coloration can be imparted to the incident light according to the colored strips located in the light passage. If the transparent strip is located in the middle above the boundary line between two different colored strips, a mixed color composed of the colors of the two bordering colored strips can be produced. If the transparent strip is located off-center above the boundary line between the two different colored strips, other mixed colors can be set according to the surface of the two strips which is free at the time.

If preferably three colored strips with three basic colors are used in a recurring sequence over the surface of the colored grid structures, for example blue, red, and yellow, the incident light can appear both in these individual pure colors and also in any mixed colors.

If, in another preferred embodiment, there is additionally a third strip-shaped grid structure of alternately transparent and opaque strips, the brightness of the incident light can be adjusted as far as complete darkening.

In the following, several embodiments of the device are described with reference to the drawings.

DETAILED DESCRIPTION OF THE DRAWINGS

Figure 1:
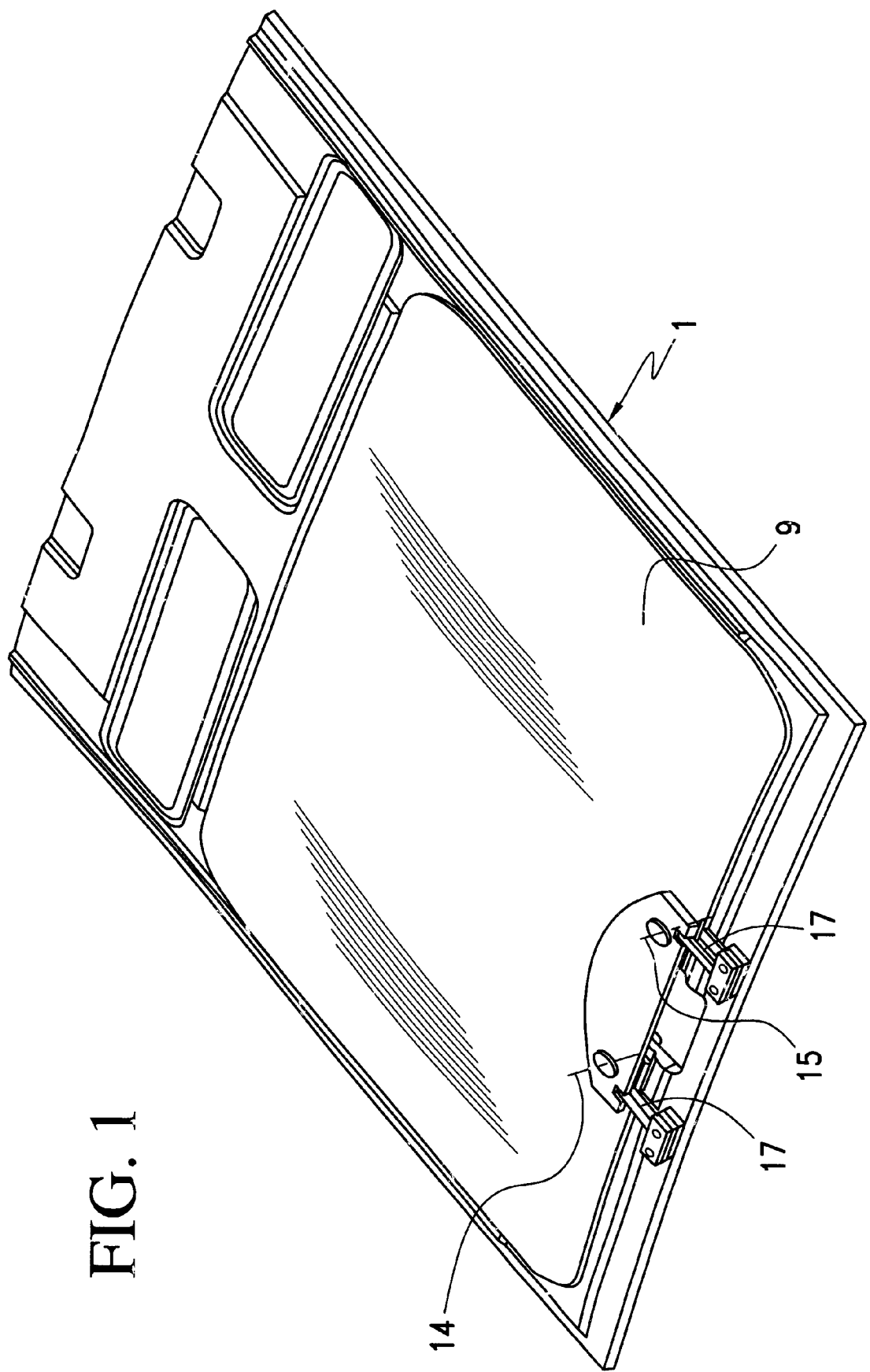
FIG. 1 shows in an overhead view in a schematic representation a light influencing device located on a support frame.

The embodiment shown in FIG. 1 for a device for influencing light for a transparent motor vehicle roof contains a support frame 1 which is located to be stationary or movable on a motor vehicle roof underneath a solid cover of glass or a transparent plastic material. The support frame 1 has a central opening and holds therein a transparent mounting plate 2 facing the interior of the motor vehicle (see the schematic in FIG. 2A) which is formed on the attached plastic film and is composed of three colored strips a, b and c of different colors in a repeating sequence, the three colors being especially the three basic colors blue (a), red (b) and yellow (c). The strip-shaped color grid 3 is aligned parallel to the lengthwise direction of the support frame 1 or the motor vehicle roof and is supported to be able to move in the transverse direction by an adjustment path. The individual colored strips a, b and c each have the same width and are, for example, 2 mm wide.

On the colored grid 3 there is a strip-shaped grid 5 which is formed, for example, as a film with a grid structure which is formed from one opaque strip 6 and one transparent strip 7 which are likewise arranged in the lengthwise direction parallel to the colored strips a, b, and c. Each transparent strip 7 has the unit width of the colored strips, i.e. for example 2 mm, conversely the opaque strip 6 has twice the width, in the example, consequently 4 mm.

Figure 2A:
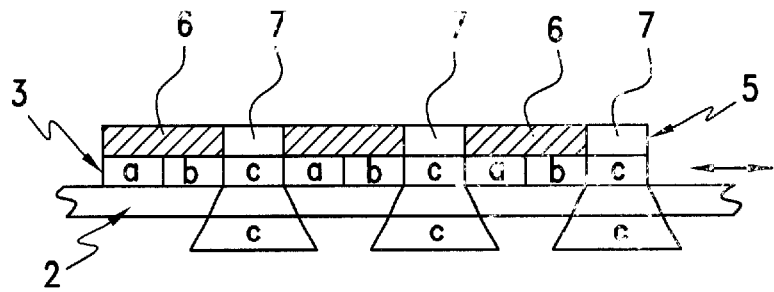
FIG. 2A shows, in a cross-sectional view, a schematic representation of a colored film and a cover film of the device in a setting in which each transparent strip is located congruently over the yellow colored strip and the opaque strips each cover the blue and the red colored strips.

By mutual displacement of the two grid structures or the films 3 and 5, for example, the lower colored film 3 relative to the stationary top cover film 5 in the transverse direction to the strips (see FIGS. 2A to 2F), the colors of the light passing through the transparent strips of the top film can be varied. FIG. 2A shows a setting in which each transparent strip 7 is located congruently over the yellow colored strip c and the opaque strips 6 each cover the blue and the red colored strips a and b. Thus, simply yellow light (schematically shown by the cone c of light) appears through the device. The entire translucent motor vehicle roof appears in the set color yellow to an individual sitting in the interior of the motor vehicle due to the host of light strips adjacent to one another. By means of a matt inner glass pane (mounting plate 2) the colored light strips and the dark strips pass gently into one another without hard contrast.

Figure 2B:
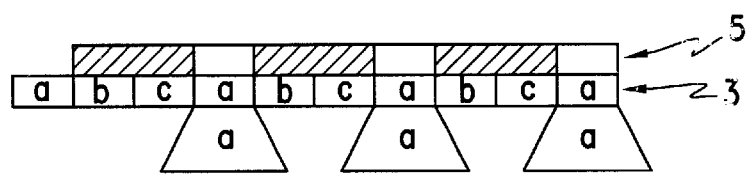
FIG. 2B shows, in a cross-sectional view, a schematic representation of a colored film and a cover film of the device in a setting in which the bottom colored film is pushed farther by one unit of width or one strip so that the transparent strip is located over the blue colored strip and an opaque strip which is twice as wide covers each of the other two colored strips.
Figure 2C:
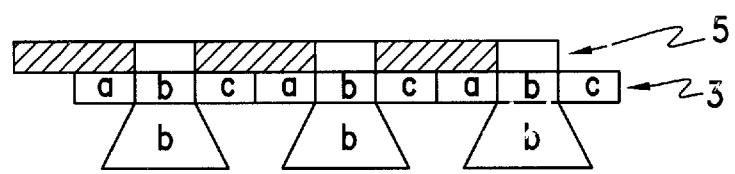
FIG. 2C shows, in a cross-sectional view, a schematic representation of a colored film and a cover film of the device in a setting in which the bottom colored film is pushed farther by one unit of width or one strip so that the transparent strip is located over the red colored strip and an opaque strip which is twice as wide covers each of the other two colored strips.

FIGS. 2B and 2C show settings in which the bottom colored film 3 is pushed farther by one unit of width or one strip so that the transparent strip 7 is located over the blue colored strip a (FIG. 2B) or the red colored strip b (FIG. 2C) and one opaque strip 6 which is twice as wide covers each of the other two colored strips.

Figure 2D:
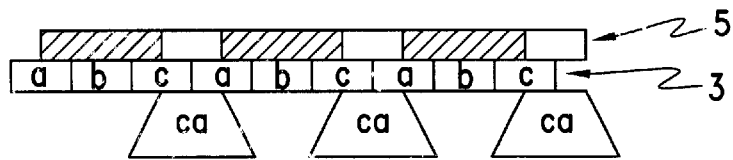
FIG. 2D shows, in a cross-sectional view, a schematic representation of a colored film and a cover film of the device in a setting in which the light from the basic colors of the yellow colored strip and of the blue colored strip produces the mixed color green.
Figure 2E:
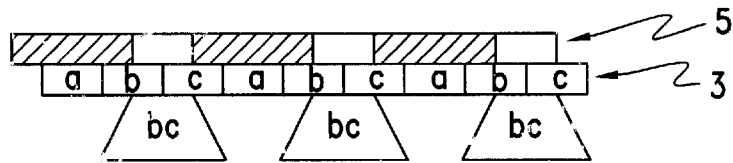
FIG. 2E shows, in a cross-sectional view, a schematic representation of a colored film and a cover film of the device in a setting in which the light from the basic colors of the red colored strip and of the yellow colored strip produces the mixed color orange.
Figure 2F:
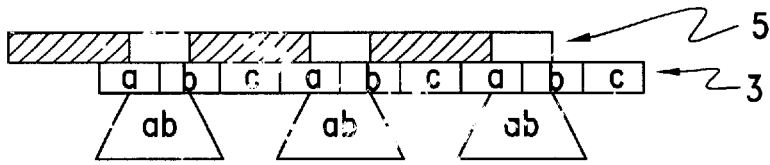
FIG. 2F shows, in a cross-sectional view, a schematic representation of a colored film and a cover film of the device in a setting in which the light from the basic colors of the blue colored strip and of the red colored strip produces the mixed color violet.
Figure 3A:
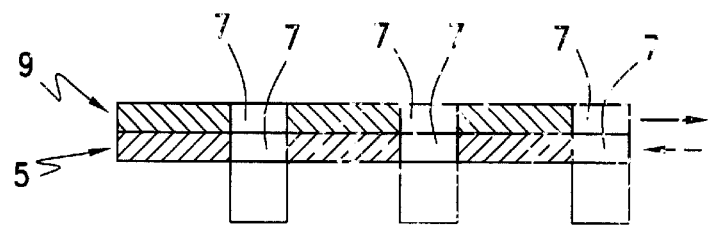
FIG. 3A shows, in a cross-sectional view, a schematic representation of two cover films of the device where at least one of the two films for brightness adjustment is shifted relative to the other in order to set the maximum brightness in an open position in which the top transparent strip is located congruently over the lower transparent strip.
Figure 3B:
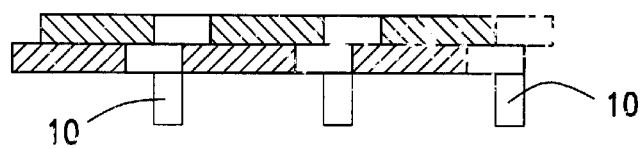
FIG. 3B shows, in a cross-sectional view, a schematic representation of two cover films of the device where partial passage of the light can be set for reduced brightness by further mutual displacement of the at least one of the two films for brightness adjustment.
Figure 3C:
FIG. 3C shows, in a cross-sectional view, a schematic representation of two cover films of the device where complete darkening is accomplished by super-positioning of the opaque strips with the transparent strip.
Figure 4A:
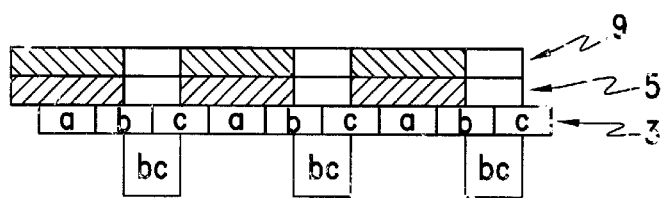
FIG. 4A shows, in a cross-sectional view, a schematic representation of two cover films and one colored film of the device where at least one of the two films for brightness adjustment is shifted relative to the other in order to set the maximum brightness in an open position in which the top transparent strip is located congruently over the lower transparent strip.
Figure 4B:
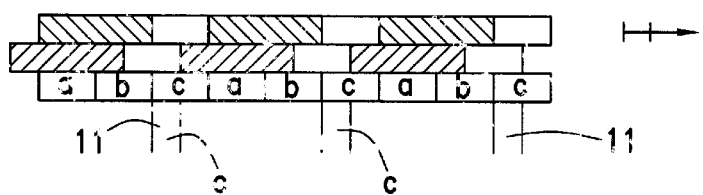
FIG. 4B shows, in a cross-sectional view, a schematic representation of two cover films and one colored film of the device where partial passage of the light can be set for reduced brightness by further mutual displacement of the at least one of the two films for brightness adjustment.
Figure 4C:
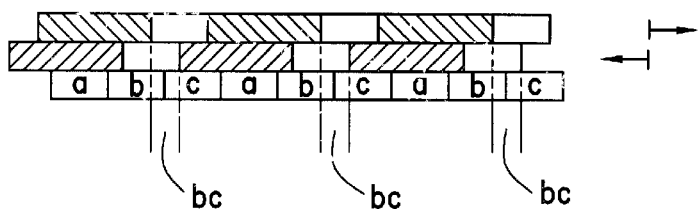
FIG. 4C shows, in a cross-sectional view, a schematic representation of two cover films and one colored film of the device where complete darkening is accomplished by superpositioning of the opaque strips with the transparent strip.

To produce mixed colors the lower colored film 3 is positioned such that the transparent strip 7 is located in the center over the boundary line 8 between two adjacent colored strips. Thus, for the setting as shown in FIG. 2D, the light from the basic colors yellow of the colored strip c and blue of the colored strip a acquires the mixed color green ca. With a further adjustment as shown in FIG. 2E the light from the basic colors red of the colored strip b and yellow of the colored strip c acquires the mixed color orange bc and for a setting as shown in FIG. 2F the light from the basic colors blue of the colored strip a and red of the colored strip b acquires the mixed color violet ab.

When the transparent strip 7 is pushed from the middle arrangement over the boundary line 8 between two adjacent colored strips so that the width of one colored strip prevails over the adjacent colored strip under the transparent strip 7, accordingly different mixed colors can be produced in the color spectrum of the rainbow.

Instead of the illustrated sharp color transitions on the boundary lines between two adjacent colored strips at a time the colored strips can also be formed to pass smoothly into one another so that the mixing of colors is improved in mixed colors. Thus, the three colored strips can also have a continuous color spectrum.

In order to be able to control the brightness of the incident light in addition to setting the color, on the top film 5 there is again a film 9 of the same type of structure (see FIGS. 3A to 3C and 4A to 4C, FIGS. 3A to 3C not showing the colored film 3). At least one of the two films 5, 9 for brightness adjustment is shifted relative to the other in order to set the maximum brightness in an open position in which the top transparent strip is located congruently over the lower transparent strip (see the position of FIGS. 3A and 4A). By further mutual displacement partial passage of the light can be set for reduced brightness (see, for example, the representation in FIG. 3B) up to complete darkening by superpositioning of the opaque strips 8 with the transparent strip 7 (see FIG. 3C).

Preferably, the two films 5, 9 for brightness adjustment are adjusted uniformly and symmetrically with respect to the open position (FIG. 3A. and 4A) by the upper film 5 and the lower film 9 being pushed simultaneously to the same degree in the opposite directions. Thus, the still remaining gap 10 for light passage through the two upper films 5, 9 remains aligned to be stationary (see FIG. 3B) and, thus, always at the same position with respect to the underlying film 3 with the colored grid (see FIG. 4C). Thus, there is no color adjustment in the brightness adjustment.

If conversely to brightness adjustment only, for example, the top film 9 is adjusted (see FIG. 4B), the remaining gap 11 for light passage (to the right in FIG. 4B) is also displaced and, thus, the color composition of the light shining through can also be changed.

Figure 5:
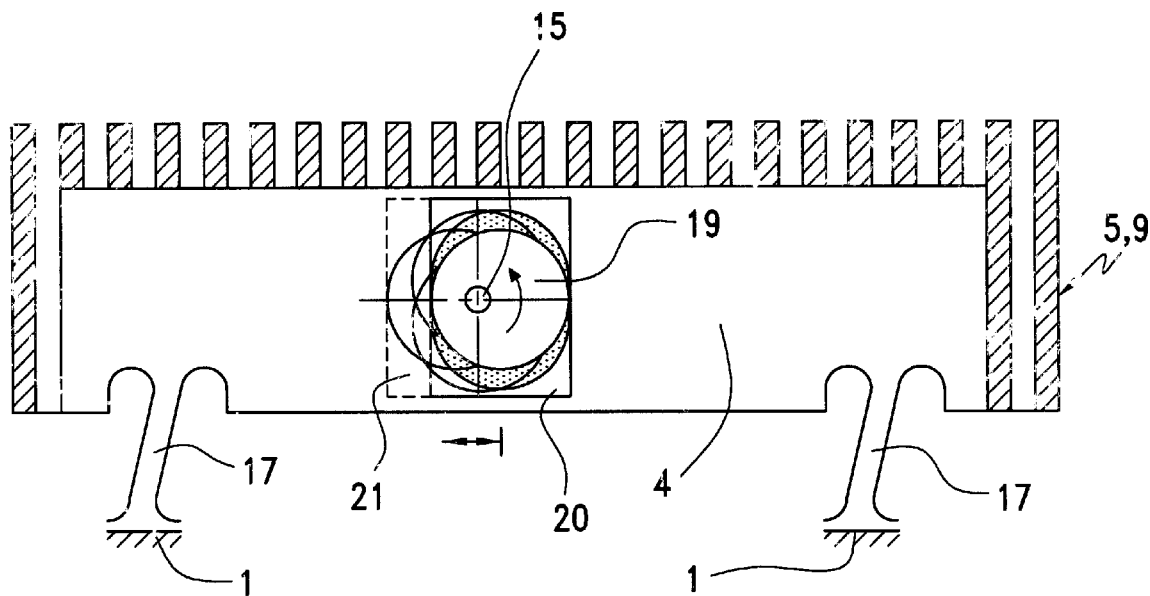
FIG. 5 shows, in an plan view, a schematic representation of a film mounting with a support and an actuating knob.
Figure 7A:
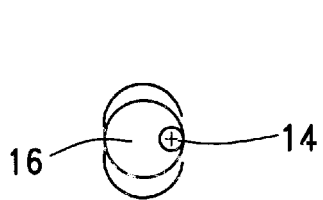
FIG. 7A & 7B are plan views of the knobs shown to the left and right, respectively in FIG. 6.
Figure 7B:
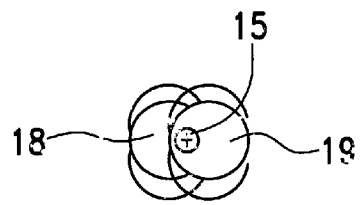
Figure 6:
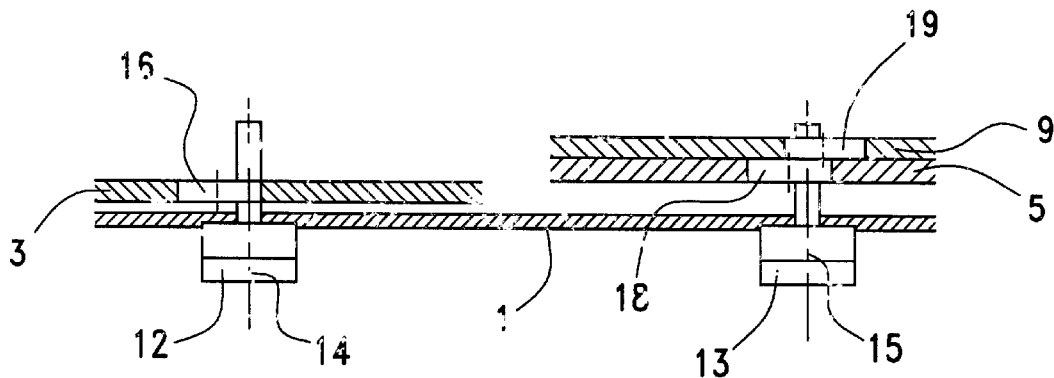
FIG. 6 shows, in a cross-sectional view, a schematic representation of two knobs for adjusting the colored film or the two cover films.

To adjust the color and brightness there are two knobs 12 and 13 (see FIG. 5 and 6) which are each pivotally located on the support frame 1 around a stationary axis 14 of rotation and 15. The knob 12 for adjusting the colored film 3 contains a cam disk 16 which is located in a lengthwise slot in the film holder 4. By turning the knob 12, via the cam disk 16 the colored film 3 which is movably supported in the transverse direction is adjusted to the desired degree. FIG. 5 schematically shows a parallelogram support of the film holder 4 of the colored film 3 and also of the covering grid films 5 and 9 by means of two lever-like, elastically swiveling connections 17 on the support frame 1. By means of the catch positions of the knob 12 preferred color settings can be easily made.

The knob 13 for adjusting brightness has two cam disks 18 and 19 which are movably arranged in one lengthwise slot 20 and 21 at a time in the two film mounts 4 of the two covering grid films 5 and 9. The opposing cam disks 18 and 19 which are offset by 180 degrees enable uniform symmetrical activation and displacement of the two films 5 and 9 for brightness adjustment. The cam disk 16 of the knob 12 for color adjustment has twice the eccentricity relative to the two cam disks 18 and 19 of the knob 13 for brightness adjustment.

On the support frame 1 of the device, a covering disk or a cover of a motor vehicle roof can be attached to be stationary.

The colored strips of the colored film 3 and the grid strips of the cover films 5 and 9 can also be aligned in the transverse direction of the roof so that the displacement movement for setting the color and brightness is accomplished in the lengthwise direction. The colored film 3 can also be attached or applied to the lower film holder which is formed as a transparent plate and which then is moved to adjust the color.

Basically, instead of the colored strips and grid strips arranged in parallel, an arrangement can also be chosen in which the colored and the covering grid strips run from one center point radially to the outside. The films or plates which bear the colored strips and the grid strips are pivotally mounted at a center point and can be adjusted around the center point for color settings and brightness settings by displacement or rotation around a center point.

What is claimed is:

1. A device for changing the passage of light through a window, comprising:
    at least two strip-shaped grid structures which lie on top of one another and are movable on top of one another; and
    an actuating device for moving the grid structures into a plurality of relative positions with respect to each other;
    wherein the at least two grid structures comprise a least one grid structure having alternately transparent and opaque strips and another grid structure having a colored grid structure with at least two colored strips of different colors in a repeating sequence.

2. The device as claimed in claim 1, wherein the colored grid structure has three colored strips of different colors in a repeating sequence.

3. The device as claimed in claim 1, wherein said least one grid structure having alternately transparent and opaque strips comprises two grid structures having alternately transparent and opaque strips.

4. The device as claimed in claim 1, wherein each of the colored strips of the colored grid structure has the same width; and wherein the at least one grid structure comprising alternately transparent and opaque strips has transparent strips with a width that is the same as the width of the colored strips and opaque strips with a width that is twice the width of the colored strips.

5. The device as claimed in claim 1, wherein the actuation device has an actuation switch for color setting and an actuation switch for brightness setting.

6. The device as claimed in claim 5, wherein the actuation switch for color setting is lockable in defined switching stages.

7. The device as claimed in claim 5, wherein said least one grid structure having alternately transparent and opaque strips comprises two grid structures having alternately transparent and opaque strips; wherein the actuation device further comprises a movement mechanism for moving the grid structures into said plurality of relative positions; and wherein the actuation switch for brightness setting is adapted to operation of said movement mechanism producing symmetrical motion of the two grid structures of alternately transparent and opaque strips in opposite directions in a manner keeping a gap for light passage in a stationary position relative to the colored grid structure.

8. The device as claimed in claim 5, wherein said least one grid structure having alternately transparent and opaque strips comprises two grid structures having alternately transparent and opaque strips; wherein the actuation device further comprises a movement mechanism for moving the grid structures into said plurality of relative positions; and wherein the actuation switch for brightness setting is adapted to operation of said movement mechanism producing symmetrical motion of the two grid structures of alternately transparent and opaque strips in opposite directions in a manner keeping a gap for light passage in a stationary position relative to the colored grid structure.

9. The device as claimed in claim 1, wherein at least one of the grid structures comprises a film which is mounted on a frame-like film mount that is movably supported on a support frame.

10. The device as claimed in claim 1, wherein the grid structures are formed from films mounted on frame-like film mounts that are movably supported on a support frame.

11. The device as claimed in claim 10, wherein the actuation device has two rotary switches, a first rotary switch for color adjustment with a first cam disk which engages the film mount for the colored film, and a second rotary switch for brightness adjustment second and third disks which are arranged offset by 180° relative to an axis of rotation of the second rotary switch; and wherein the second and third cam disks engage respective film mounts of the grid structures for producing movement of the film mounts adjusting the brightness of light admitted therethrough.

12. The device as claimed in claim 1, wherein a support frame is provided for installation of the device on a motor vehicle roof.

13. The device as claimed in claim 1, wherein the at least two colored strips of the colored grid structure form a common color spectrum with a smooth transition.

14. A motor vehicle roof comprising:
    a transparent cover,
    a device for changing the passage of light through the transparent cover, comprising:
        at least two strip-shaped grid structures which lie on top of one another and are movable on top of one another; and
        an actuating device for moving the grid structures into a plurality of relative positions with respect to each other;
        wherein the at least two grid structures comprise a least one grid structure having alternately transparent and opaque strips and another grid structure having a colored grid structure with at least two colored strips of different colors in a repeating sequence.

15. The motor vehicle roof as claimed in claim 14, wherein the device is carried by a support frame that is connected to the motor vehicle roof.

16. The motor vehicle roof as claimed in claim 15, wherein the support frame is movably supported on the motor vehicle roof.

17. The motor vehicle roof as claimed in claim 14, wherein the at least two colored strips of the colored grid structure form a common color spectrum with a smooth transition.

18. The device as claimed in claim 14, wherein the actuation device has an actuation switch for color setting and an actuation switch for brightness setting.

* * * * *